April 9, 1940.  W. B. ROSS  2,196,740

SEPARABLE HINGE FOR MOLDED BODY PARTS

Filed Oct. 23, 1936

Wallace B. Ross
INVENTOR.

BY

ATTORNEYS

Patented Apr. 9, 1940

2,196,740

UNITED STATES PATENT OFFICE 2,196,740

SEPARABLE HINGE FOR MOLDED BODY PARTS

Wallace B. Ross, Canastota, N. Y., assignor, by mesne assignments, to Eastman Kodak Company, Jersey City, N. J., a corporation of New Jersey Application October 23, 1936, Serial No. 107,247

8 Claims. (Cl. 217—57)

This invention relates to photography and particularly to a separable hinge connection for cameras made of a molded material and being so constructed as to have the camera back entirely separable from the camera body for film loading purposes.

Cameras made of a molded composition are becoming more and more popular in the photographic field due to their lightness, their durability, and their attractiveness. Camera constructions wherein the camera back is entirely separable from the camera body for film loading purposes have been found to be very well adapted to molding operations, but providing a separable hinge connection for the two parts has presented a real problem. The most logical way of forming a separable hinge connection of this type has been found to involve including a tongue on one of the camera parts which is adapted to fit into a recess molded into the other camera part. It can be readily understood by those skilled in the art that in a separable hinge of this type the recess would have to include a partial side wall which would extend upward from the bottom of the recess for the purpose of maintaining the tongue in said recess. It has also been found advisable to provide this partial side wall of the recess with an inturned lip which is adapted to fit into an undercut portion of the tongue on the other camera part for the purpose of clinching the two parts together and preventing the tongue from being removed from the recess when the two camera parts are properly hinged and moved to an angle of less than 90° relative to one another.

A camera molded from a plastic and so constructed as to have its back entirely separable from its front for loading purposes is subject to considerable expansion and contraction due to temperature and atmospheric changes so that if the separable hinge parts are directly molded on the two camera parts it is next to impossible to provide hinge parts which will satisfactorily cooperate with one another under this expansion and contraction of the camera parts. Great difficulty and waste have been encountered in molding a camera part provided with a recess having a partial side wall including an internal lip, because such a molding job, as will be appreciated by those skilled in the art, requires a separate removable core in the die which is difficult to handle due to the fragile characteristics of the particular recess required.

Therefore, one object of my invention is to provide a separable hinge connection for a molded camera having separable parts which eliminates the need for forming the partial side wall and inturned lip on the recess during the molding operation and thereby overcomes all difficulties formerly arising in this molding operation. Another object is to provide a separable hinge connection which is durable and will stand rougher use than former molded separable hinge connections of the same type. And still another object is to provide a separable hinge which lends itself to flexibility in assembling and replacement of certain parts. And another object is to provide a separable hinge connection which is adapted to give a more efficient connection through a wider range of positions of the separable parts than is possible with an entirely molded hinge connection of the known type. And still another object is to provide a separable hinge for molded camera parts which will provide a satisfactory and efficient connection even under conditions of considerable expansion or contraction of the two parts due to temperature and atmospheric changes.

Briefly my novel separable hinge connection comprises a camera back of molded composition in which a one sided recess is formed during the molding operation. A metal hinge strip is fastened to the camera back to partly cover the recess therein and form a keeper opening therewith having an inturned lip which is adapted to engage an under cut tongue molded on the other camera part when said tongue is placed in the keeper opening whereby the tongue is maintained in said keeper opening throughout a substantial relative rotation of the two camera parts.

The novel features that I consider characteristic of my invention are set forth with particularity in the appended claims. The invention itself, however, both as to its organization and its methods of operation, together with additional objects and advantages thereof, will best be understood from the following description of specific embodiments when read in connection with the accompanying drawing in which, Fig. 1 is a vertical section of a molded camera equipped with a preferred embodiment of my separable hinge connection, and showing the camera parts partially separated.

Like reference characters refer to corresponding parts throughout the drawing.

Figure 1:
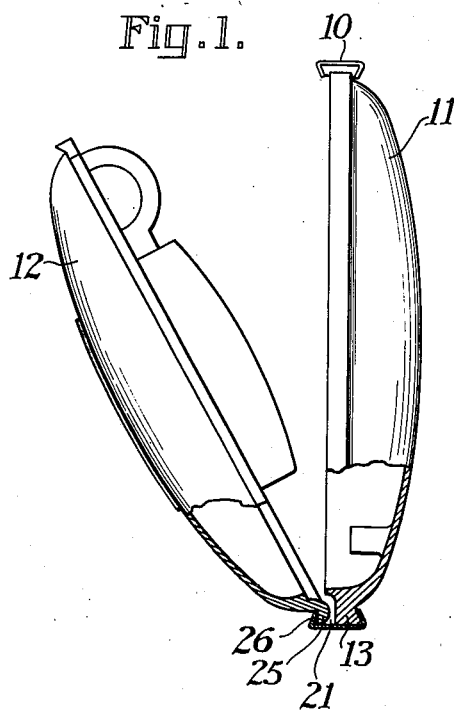

Referring now particularly to Fig. 1 wherein a preferred embodiment of my invention is shown, I have illustrated how a camera back 11 and a camera body 12, each of said camera parts being separate and molded from a suitable composition, are hinged together, at their lower ends when equipped with a separable hinge connection constructed in a manner hereinafter described. The upper ends of the camera parts 11 and 12 can be fastened together by any type of desirable latch 10 which can be of any well known construction.

Figure 2:
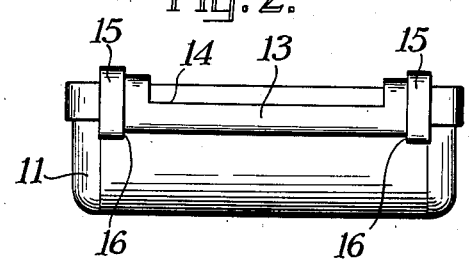
Fig. 2 is an enlarged end elevation of the camera back showing the back as it comes from the mold.
Figure 3:
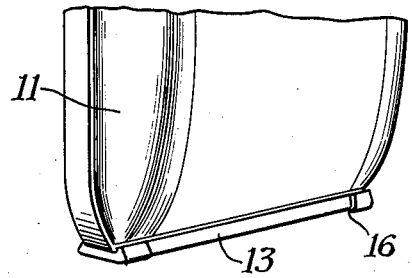
Fig. 3 is a rear perspective of the camera back showing the undercut edges of the rail along the bottom of the camera back.
Figure 4:
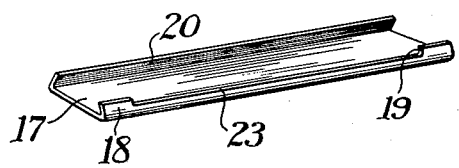
Fig. 4 is a perspective of the hinge strip which covers the recess in the camera back to provide a keeper opening.
Figure 5:
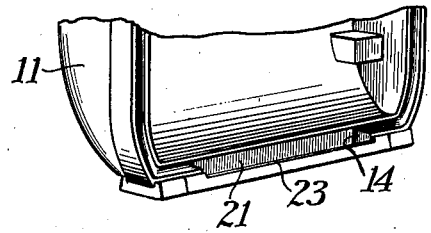
Fig. 5 is an enlarged perspective of the camera back showing the keeper opening formed by the clinching of the hinge strip to the molded rail.
Figure 6:
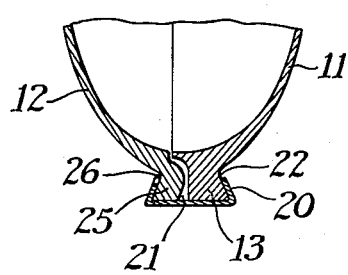
Fig. 6 is a vertical section showing the separable hinge connection in closed position.

The camera back 11 is molded in one piece in a single operation and referring to Figs. 2, 3 and 5, the lower end thereof is provided with an undercut rail 13 in which a recess 14 is formed. A pair of posts 15 are molded onto each end of the rail 13 and although they are shown to be the same shape as the rail proper they are slightly larger all around to provide the abutments 16 for the purpose hereinafter described.

A channeled hinge strip 17 having one side wall 18 provided with a cut out portion 19 which is equal in length to the recess 14 in the rail 13 and having the other side wall 20 continuous is clinched over the undercut rail 13, see Fig. 5, so that the cut out portion 19 is adjacent the recess 14, and the channeled hinge strip forms a keeper opening 21 with the recess for the purposes hereinafter described. The hinge strip 17 is preferably made of metal but any suitable material can be used, and is of such a thickness and length that it fits against the abutments 16 formed in the rail by the posts 15 and lies flush with the surface of said posts 15 to provide a smooth finished surface. The depth of the side walls 18 and 20 of the channeled hinge strip is such that they snugly clinch over the undercut portions 22 of the rail 13, and the cut out portion 19 of the side wall 18 is just deep enough to leave a partial side wall 23 adjacent the recess 14 which is inturned for the purpose hereinafter described.

In molding the camera front 12 a tongue 25 is provided on the lower end thereof, said tongue extending longitudinally of the end of the camera front and being of a suitable length to fit into the keeper opening 21 in the end of the camera back 11. One face of the tongue 25 is undercut, as shown at 26, so that when the two camera parts 11 and 12 are placed together as shown in Fig. 1, the inturned partial side wall 23 of the keeper opening 21 will engage the undercut face of the tongue 25 and will overhang said tongue to require a substantial relative rotation between the two camera parts 11 and 12 in order to effect or break the hinge connection formed by the tongue 25 on the camera front and the keeper opening 21 in the camera back. It is to be understood that the tongue 25 can be formed on the camera body, and the keeper opening 21 can be formed on the camera back without deviating from the spirit of the invention, but I have shown them in just the opposite sense in the drawing, because the separable hinge described is most easily assembled or disassembled when the tongue 25 is moved relative to the keeper opening 21 and most people being right handed would, in separating a camera as described, tend to hold the heavier part, the camera front, with their right hand and rotate it relative to the camera back 11.

Figure 7:
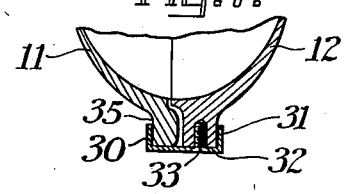
Fig. 7 is a vertical section showing a modification of the hinge strip and the method of applying it to the camera back.

In Fig. 7 is shown a modification of my invention wherein the hinge strip comprises a channel having straight side walls 30 and 31, the channel being fastened to the straight sided rail member 32 by means of screws 33 instead of being clinched onto an undercut rail as shown on the preferred form of the separable hinge. The side wall 30 of the channeled hinge strip is provided with a cut out portion adjacent the recess in the rail member as shown in the preferred form of the hinge connection to allow an entrance into the keeper opening through which the tongue on the opposite camera part can be inserted. The partial side wall formed in the channeled strip adjacent the recess, similar to the structure 14 and 23 of Fig. 5, is left straight instead of being inturned and is adapted to engage a straight face 35 on the tongue on the camera front. Although this modified structure does not provide a separable hinge structure having the gripping characteristics of the preferred form of the hinge, it does provide a hinge which is cheap and will operate satisfactorily as a hinge connection for separable cameras of the molded type.

From the above description of the construction and operation of my novel hinge connection it will readily be understood that a hinge connection is provided which could not be molded along with the camera parts without involving considerable difficulty and waste. To those skilled in the art it will be obvious that in order to mold a camera part having a keeper opening 21 see Fig. 5, wherein rather fragile parts are involved, a rather involved molding operation would have to be performed and imperfect pieces would be frequent. If it were possible to efficiently mold a part including a keeper opening 21, it is obvious that due to the brittle characteristics of a molding composition and the fragile nature of the parts of the keeper opening, great care would have to be taken in handling a camera part so constructed, because the location and accessibility of the keeper opening would render it very susceptible to accidental rupture. With the keeper opening formed by a separate hinged strip as shown in my novel hinge connection, an easily assembled hinge part is formed which allows the camera part containing the keeper opening to be readily molded, and by forming the keeper opening by a separate hinge strip as described a whole camera back is not rendered entirely useless when the keeper opening is deformed by accident, as would be the case with a molded keeper opening, because the hinge strips can be readily interchanged on a given camera back and a new keeper opening thus formed.

Having now particularly described my invention what I desire to secure by Letters Patent of the United States, and what I claim is:

1. A separable hinge for the purpose set forth comprising two molded frame parts, a tongue on one end of one frame part, one end of the second frame part provided with a recess to receive said tongue, the edges of said second part adjacent said recess therein being undercut, a channeled hinge strip clinched over the undercut edges of the second part in covering relation with the recess, and having an overhanging wall forming a side of said recess for maintaining said tongue therein.

2. A separable hinge for the purpose set forth comprising two molded frame parts, an undercut tongue on one end of one part, the second part provided with a recess which is adapted to receive said tongue, a substantially rigid hinge strip affixed to the second part in covering relation to the recess therein, and including an inturned wall overhanging said recess and adapted to engage the undercut tongue and maintain it in said recess.

3. A separable hinge for the purpose set forth comprising two molded frame members, an undercut rail on one end of one frame part provided with a recess, a channeled hinge strip clinched over said rail in covering relation with the recess therein and including an overhanging wall adapted or form a side of said recess, and an undercut tongue on one end of said second frame part which is adapted to enter said recess and be engaged by and maintained in said recess by the overhanging wall.

4. A separable hinge for the purpose set forth comprising two molded frame parts, a tongue on one end of one frame part, one end of the second frame part provided with a recess which is adapted to receive said tongue, a channeled metal strip affixed to the second frame part in covering relation with respect to the recess therein, one side wall of said channeled metal strip adapted at all times to form a side of said recess for maintaining the tongue therein.

5. A separable hinge for the purpose set forth comprising two molded frame parts, an undercut tongue on one end of one part, a rail fixed to one end of the other frame part and extending longitudinally thereof, said rail including a recess and having its longitudinal edges undercut, and a channeled metal strip fixed to said rail by having its side walls clinched over the undercut edges of the rail, one side wall of said metal strip covering said recess and adapted to form a keeper opening for receiving the undercut tongue and maintaining it in said keeper opening.

6. A separable hinge for the purpose set forth comprising two frame parts, a rail fixed to one end of one part and extending longitudinally thereof, said rail having its longitudinal edges undercut and having one edge cut out intermediate the ends of the rail, a metal strip fixed to the rail by clinching its edges over the undercut edges of the rail whereby a keeper opening having an inturned edge is formed with the cut out portion of the rail, a lug fixed to and extending longitudinally of the end of the second part, said lug shaped to fit into the keeper opening and having one of its longitudinal edges undercut to be engaged by the inturned edge of the keeper opening when inserted therein.

7. A separable hinge for the purpose set forth comprising two frame parts, a rail fixed to one end of one frame part and extending longitudinally thereof, said rail having a portion intermediate its ends cut out and having its longitudinal edges undercut, a metal strip fixed to said rail by having its longitudinal edges clinched over the undercut edges of the rail whereby a keeper opening having an inturned edge is formed by the portion of said metal strip covering the cutout portion of the rail, a tongue on one end of the other frame part extending longitudinally thereof and adapted to fit into the keeper opening in the first frame part, when the two parts are brought together at an angle, one longitudinal edge of said tongue being undercut to engage the inturned edge of the keeper opening, whereby the two frame parts are held against separation when they are brought together.

8. A separable hinge for the purpose set forth comprising two molded frame parts, a tongue extending from one end of one of the frame parts, one end of the other frame part provided with a recess adapted to receive said tongue, and a substantially rigid hinge strip fixed to the second frame part adjacent the recess therein, and including an overhanging wall adapted at all times to form a side for said recess for maintaining the tongue therein.

WALLACE B. ROSS.